US012638026B2

(12) United States Patent
Broyles et al.

(10) Patent No.: US 12,638,026 B2
(45) Date of Patent: May 26, 2026

(54) ADAPTIVE REPRESSURIZER

(71) Applicant: ARAMCO SERVICES COMPANY, Houston, TX (US)

(72) Inventors: John David Broyles, Houston, TX (US); Jinhong Chen, Katy, TX (US); Stacey M. Althaus, Houston, TX (US); Jewel Duncan, Houston, TX (US)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 480 days.

(21) Appl. No.: 18/321,443

(22) Filed: May 22, 2023

(65) Prior Publication Data

US 2024/0392809 A1 Nov. 28, 2024

(51) Int. Cl.
*F04B 39/00* (2006.01)
*F15B 1/033* (2006.01)
*F15B 1/24* (2006.01)

(52) U.S. Cl.
CPC ................ *F15B 1/24* (2013.01); *F15B 1/033* (2013.01); *F04B 39/0005* (2013.01); *F15B 2201/31* (2013.01); *F15B 2201/411* (2013.01); *F15B 2201/4155* (2013.01); *F17C 2227/0192* (2013.01); *F17C 2250/043* (2013.01)

(58) Field of Classification Search
CPC ........ F17C 2227/0192; F17C 2250/043; F04B 39/0005; F04B 39/0011
See application file for complete search history.

(56) References Cited

U.S. PATENT DOCUMENTS 4,750,869 A 6/1988 Shipman, III
9,791,105 B2 * 10/2017 Whiteman ................ F17C 5/06
(Continued)

FOREIGN PATENT DOCUMENTS

EP 2746641 A1 * 6/2014 ................ F17C 5/06
IT UD20090011 A1 7/2010

OTHER PUBLICATIONS

Span, R. et al., "A New Equation of State for Carbon Dioxide Covering the Fluid Region from the Triple-Point Temperature to 1100 K at Pressures up to 800 MPa"; Journal of Physical and Chemical Reference Data; vol. 25, Issue 6; pp. 1059-1596; Nov. 1996 (88 pages).

*Primary Examiner* — Kevin F Murphy
(74) *Attorney, Agent, or Firm* — Osha Bergman Watanabe & Burton LLP

(57) ABSTRACT

A method for recovering a source gas at a specific pressure uses an adaptive repressurizer system including a series of valves configured to control flow circuit connections within the adaptive repressurizer system. The method includes disposing a gas container containing the source gas within the system. The method includes connecting the gas container; connecting a hydro source; connecting a utility gas source; connecting a vacuum source; and disposing an accumulator within the adaptive repressurizer system. The accumulator is connected to the gas side and to the hydraulic side circuits. The method includes moving the piston by pressurizing the gas-side circuit with the utility gas. The method includes actuating the adaptive repressurizer system to change a first gas pressure of the source gas to a second gas pressure; applying the source gas at the second gas pressure to a laboratory application; and evacuating the gas-side circuit to the vacuum source.

17 Claims, 7 Drawing Sheets

(56) References Cited

U.S. PATENT DOCUMENTS

| | | | | |
|---|---|---|---|---|
| 10,883,663 | B2 * | 1/2021 | Karam | F17C 13/04 |
| 2010/0059138 | A1 * | 3/2010 | Shi | F17C 5/06 222/395 |
| 2022/0065401 | A1 * | 3/2022 | Edoardo | F04B 39/0011 |

* cited by examiner

ADAPTIVE REPRESSURIZER

BACKGROUND

Modulating gas pressure and temperature is routinely required in industry and research laboratory applications because the applications require that the gas be used at a controlled state. For those gases that are readily available with large quantity, controlling pressure is easy to achieve, for example, by using a simple regulator to reduce the gas pressure or a pressure pump to increase its pressure. However, on many occasions, a special, relatively expensive gas, for example, $^{13}C$ labeled carbon dioxide ($^{13}CO_2$) is used in applications such as the NMR study of geological carbon sequestration. In this case, the available gas is usually at a pressure that is relatively low compared to the application requirements.

Furthermore, conventional pressure increasing systems such as gas boosters or compression systems require more volume than is available in the bottle or cylinder in which the source gas is provided. For example, the purchased $^{13}CO_2$ is in a "lecture" bottle of less than five-hundred ml (milliliters) and at less than three-hundred psi (pounds per square inch). Such a source of $^{13}CO_2$ cannot be used directly from the source gas bottle because the pressure is too low for applications where higher pressure is required, and such as source cannot be used with conventional gas boosters because the volume is too low for use with those gas boosters. For some laboratory applications, the source gas pressure within the bottle is too high for the application. For these applications, in order to reduce the gas pressure, conventional gas modulation systems may require a minimum amount of gas volume that consumes too much of the total of the source gas volume.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to a method for recovering a source gas at a specific pressure using an adaptive repressurizer system comprising a series of valves configured to control flow circuit connections within the adaptive repressurizer system, the method comprising: disposing a gas container containing the source gas within the adaptive repressurizer system; connecting the gas container to a gas side circuit within the adaptive repressurizer system so as to allow a gas-flow connection with the gas-side circuit; connecting a hydro source comprising a hydraulic substance to a hydraulic side circuit within the adaptive repressurizer system so as to allow a hydraulic-flow connection with the hydraulic-side circuit; connecting a utility gas source comprising a utility gas to the gas-side circuit so as to allow a gas-flow connection with the gas-side circuit; connecting a vacuum source to the gas-side circuit at a vacuum port disposed on the gas-side circuit and configured to evacuate the gas-side circuit and to draw the source gas out to recover the source gas; disposing an accumulator within the adaptive repressurizer system, wherein the accumulator comprises a piston, which is configured with a dry side of the piston for interaction with the gas-side circuit and a wet side of the piston for interaction with the hydraulic-side circuit within the adaptive repressurizer system, and wherein an accumulator gas side is connected to the gas side circuit so as to allow a gas-flow connection with the gas-side circuit and an accumulator hydraulic side is connected to the hydraulic side circuit; moving the piston by pressurizing the gas-side circuit with the utility gas from the utility gas source applied to the dry side of the piston; actuating the adaptive repressurizer system to change a first gas pressure of the source gas to a second gas pressure; applying the source gas at the second gas pressure to a laboratory application; and recovering the source gas by drawing the source gas out of the adaptive repressurizer system by evacuating the gas-side circuit through the vacuum port to the vacuum source.

In one aspect, embodiments disclosed herein relate to an adaptive repressurizer system for changing a gas pressure of a source gas, the adaptive repressurizer system comprising: a series of valves configured to control flow circuit connections within the adaptive repressurizer system; a gas container containing the source gas; a gas side circuit configured to contain the source gas at a first gas pressure and connected to the gas container through a gas-flow connection; a hydraulic side circuit connected through a hydraulic-flow connection to a hydro source comprising a hydraulic substance and configured to hold the hydraulic substance disposed in the hydraulic-side circuit at a hydraulic substance pressure; an accumulator comprising: an accumulator gas side connected to the gas side circuit; an accumulator hydraulic side hydraulically connected to the hydraulic side circuit; and a piston configured with a dry side of the piston and a wet side of the piston, wherein the accumulator is configured to change, hydraulically via the piston, the first gas pressure of the source gas to a second gas pressure by changing a first gas volume at the first gas pressure to a second gas volume at the second gas pressure, and wherein the source gas at the second gas pressure is applied to a laboratory application; wherein the source gas is drawn out of the adaptive repressurizer system.

Other aspects and advantages of the claimed subject matter will be apparent from the following description and the appended claims.

DETAILED DESCRIPTION

In the following detailed description of embodiments of the disclosure, numerous specific details are set forth in order to provide a more thorough understanding of the disclosure. However, it will be apparent to one of ordinary skill in the art that the disclosure may be practiced without these specific details. In other instances, well-known features have not been described in detail to avoid unnecessarily complicating the description.

Throughout the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as using the terms "before," "after," "single," and other such terminology. Rather, the use of ordinal numbers is to distinguish between the elements. By way of an example, a first element is distinct from a second element, and the first element may encompass more than one element and succeed (or precede) the second element in an ordering of elements.

Embodiments of the present disclosure introduce an adaptive repressurizer developed to modulate the output gas pressure from a small quantity gas source to meet application requirements that are below or above the source pressure. The advantages of the adaptive repressurizer include modulating a wide range of output gas pressures, both below and above the source pressure, to meet most laboratory application needs. The adaptive repressurizer maximizes utilization of the relatively expensive source gas from the relatively small source gas container. The adaptive repressurizer includes a compartmentalization feature separating gas and/or hydraulic circuits of the system from other gas and/or hydraulic circuits of the system to facilitate vacuuming one or all of the laboratory application, specific lines of circuits, and/or entire circuits. The compartmentalization allows recovering as much of the expensive source gas as possible while avoiding vacuuming the whole system. The adaptive repressurizer includes a pressure monitoring capability to facilitate monitoring gas pressure at various locations, sections, circuits, and specific lines of circuits within the system. The adaptive repressurizer is unitized and packaged within a sealable enclosure that provides isothermal control, temperature stability, and/or safety from release of pressure resulting in kinetic energy hazards as well as chemical inhalation and contact hazards.

Figure 1A:
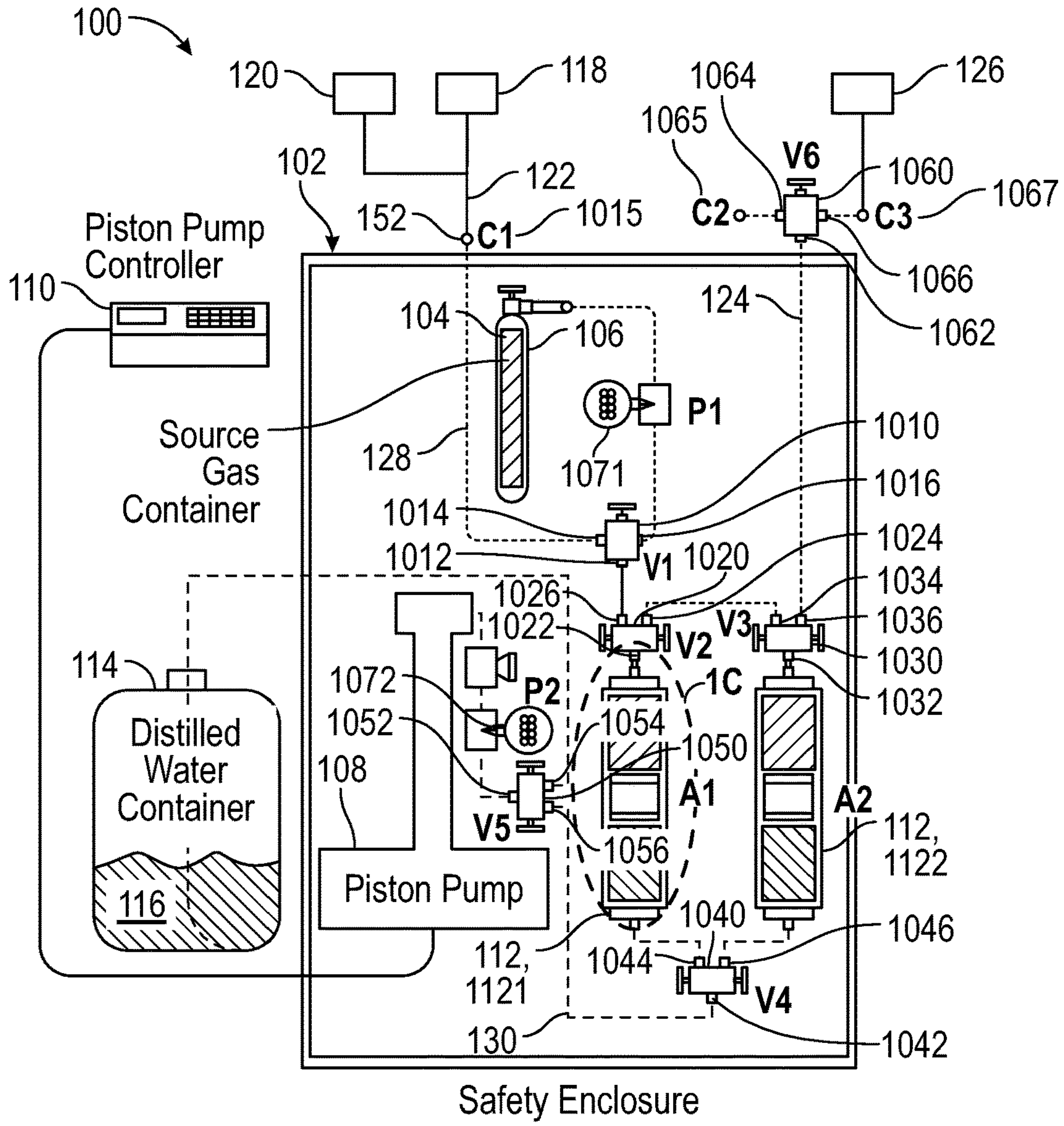
FIG. 1A, FIG. 1B, and FIG. 1C show an exemplary schematic in accordance with one or more embodiments.
Figure 1B:
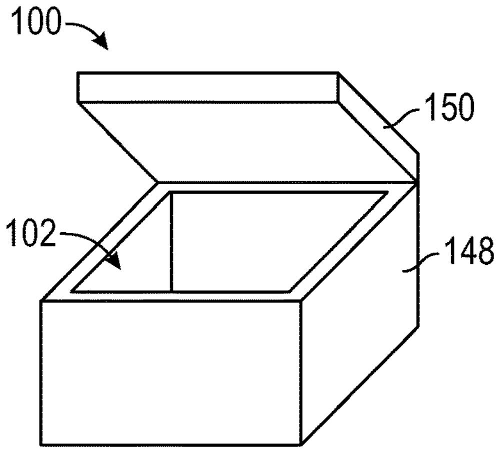
Figure 1C:
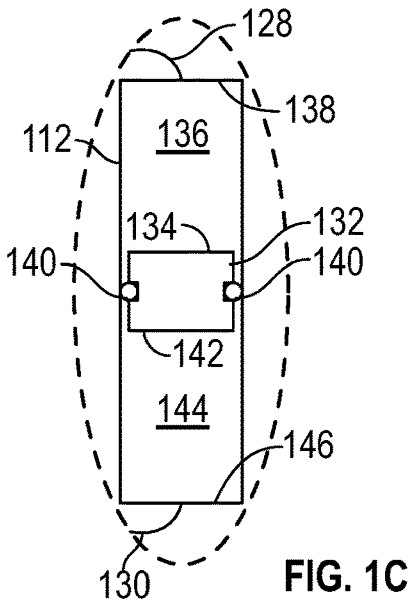

FIG. 1A, FIG. 1B, and FIG. 1C show an exemplary schematic in accordance with one or more embodiments. In one or more embodiments, one or more of the modules and/or elements shown in FIG. 1A, FIG. 1B, and FIG. 1C may be omitted, repeated, combined, and/or substituted. Accordingly, embodiments disclosed herein should not be considered limited to the specific arrangements of modules and/or elements shown in FIGS. 1A, 1B, and 1C. An adaptive repressurizer system 100 is used for changing a gas pressure of a source gas 104. The adaptive repressurizer system 100 has the functionality to either increase or decrease the pressure of source gas 104 to a pressure above or below the source gas pressure in a source gas container 106.

The adaptive repressurizer system 100 includes an adaptive repressurizer 102, a pump controller 110, and a hydro source such as a tank 114 for the hydraulic substance 116 such as distilled water. Distilled water may be a composition consisting essentially of distilled water. The adaptive repressurizer system 100 also includes a utility gas source 118 of a utility gas 122 such as compressed air. The adaptive repressurizer system 100 also has a gas output 124 that may be used to connect to a laboratory application 126. The adaptive repressurizer 102 has the source gas container 106, a piston pump 108, and at least one accumulator 112 disposed within adaptive repressurizer 102.

The pump controller executes various user inputs. For example, using the pump controller, a user may enter an output gas pressure, such as a target pressure range. Upon receipt of a command, such as a user command, the pump controller controls the movement of water in or out of the system thereby controlling the motion of the piston in the accumulator. The user command may be, for example, an actuation signal such as a start command sent from the user through a control system and/or a monitoring subsystem to the adaptive repressurizer system. Controlling the motion of the piston thereby controls the output gas pressure. The pump controller has the capability for other user inputs. For example, the user may enter a setting for a target rate of flow or a target constant pressure. In accordance with one or more embodiments the pump controller may also control refilling the pump when fluid is exhausted and emptying the pump when it is full. The pump controller may have the capability for closing and/or opening certain necessary valves such as a valve V5, (e.g., a pump valve 1050) to direct the fluid to the distilled water container rather than to the hydraulic side circuit. The pump controller may be disposed outside the safety containment. The pump controller may not require containment if, for example, the pump controller does not pose an unacceptable risk from heat or pressure. The pump controller manages pressures and may not include measures for temperature control. Commercially available pump controllers as of the priority date of this patent application include, for example, SyriXus™ pumps controller part numbers 681240114 and 681240850.

The adaptive repressurizer 102 has two primary flow circuits: a dry or a gas-side circuit 128 and a wet or a hydraulic-side circuit 130. Source gas container 106 is arranged within the gas-side circuit 128 and piston pump 108 is arranged within the hydraulic-side circuit 130. The adaptive repressurizer 102 has a series of valves configured to control flow circuit connections. Gas-side circuit 128 is specified with a pressure rating, chemical compatibility, and flow capacity to contain the pressure of and to flow at a flowrate of the source gas 104 through gas-side circuit 128 and gas-flow connections. For example, gas-side circuit 128 connects to source gas container 106 to allow a gas-flow connection between gas-side circuit 128 and source gas container 106 thereby allowing flow of source gas 104 through adaptive repressurizer 102. Likewise, hydraulic-side circuit 130 is specified with a pressure rating, chemical compatibility, and flow capacity to contain the pressure of and to flow at a flowrate of the hydraulic substance 116 through hydraulic-side circuit 130 and hydraulic-flow connections. For example, hydraulic-side circuit 130 connects to the hydro source such as tank 114 to allow a hydraulic-flow connection between hydraulic-side circuit 130 and hydraulic substance 116 thereby allowing flow of hydraulic substance 116 through adaptive repressurizer 102. The gas-side circuit 128 may be configured to contain the source gas 104 disposed within gas-side circuit 128 at a first gas pressure and/or a second gas pressure. The hydraulic-side circuit 130 may be configured to contain the hydraulic substance 116 disposed within hydraulic-side circuit 130 at a hydraulic substance pressure.

Accumulator 112 is a piston-type accumulator with an accumulator gas side 136 connected to gas-side circuit 128 to provide a gas-flow connection. Accumulator 112 also has an accumulator hydraulic side 144 connected to hydraulic-side circuit 130 to provide a hydraulic-flow connection. Accumulator 112 has a piston 132 inside accumulator 112 that separates the gas side from the hydraulic side. Piston 132 has a piston dry side 134 and a piston wet side 142 corresponding with the piston's orientation within accumulator 112. Piston dry side 134 is oriented toward the accumulator gas side 136 and thereby the gas-side circuit 128 and is thus configured for interaction with gas-side circuit 128. Piston wet side 142 is oriented toward the accumulator hydraulic side 144 and thereby the hydraulic-side circuit 130 and is thus configured for interaction with hydraulic-side circuit 130.

Accumulator 112 is arranged within adaptive repressurizer 102 to change the gas pressure of the source gas from a first gas pressure to a second gas pressure. Piston 132 may be moved along the accumulator gas side 136 toward the gas-side circuit 128 to an accumulator top 138. An accumulator gas side 136 minimum volume corresponds with piston 132 positioned at accumulator top 138. Piston 132 may be moved along accumulator hydraulic side 144 toward the hydraulic-side circuit 130 to an accumulator bottom 146. Before, when, or after piston 132 is at accumulator top 138, source gas 104 introduced through gas-side circuit 128 into accumulator gas side 136 may move piston 132 along accumulator hydraulic side 144 to accumulator bottom 146. Source gas 104 from source gas container 106 may reduce in pressure from a bottle pressure to a lower source gas pressure within gas-side circuit 128. In this manner, source gas 104 may be applied to a laboratory application at a pressure lower than the pressure within source gas container 106.

Before, when, or after piston 132 is at accumulator bottom 146 and accumulator gas side 136 is isolated from gas-side circuit 128, then source gas 104 inside the accumulator gas side 136 at a first gas volume may increase in pressure from a first gas pressure at the first gas volume to a second gas pressure at the second gas volume corresponding with piston 132 moving away from accumulator bottom 146 along accumulator hydraulic side 144 toward accumulator top 138. Piston 132 may be moved along accumulator hydraulic side 144 toward accumulator top 138 before, when, or after hydraulic substance 116 introduced through hydraulic-side circuit 130 into accumulator hydraulic side 144.

For piston 132 to move toward accumulator top 138, the force of the hydraulic substance 116 pressure inside accumulator hydraulic side 144 acting upon piston wet side 142 must exceed a piston drag force cause by a friction force of piston seals against accumulator 112 internal bore and the force of the source gas 104 pressure inside accumulator gas side 136 acting upon piston dry side 134. In this manner, the accumulator 112 is configured to change, hydraulically via the piston 132, the first gas pressure of the source gas to a second gas pressure by changing the first gas volume at the first gas pressure to a second gas volume at the second gas pressure. In this manner, source gas may be applied to a laboratory application at a pressure higher than the pressure within source gas container 106.

Adaptive repressurizer system 100 may include more than one of accumulator 112 within adaptive repressurizer 102. Additions of accumulator 112 may be designated as accumulator 112*a* through the accumulator 112 $i_{accum}$. The first of accumulator 112 may be designated as accumulator 112*a* and a second one of accumulator 112 may be designated as accumulator 112*b*. Accumulator 112*b* may be specified and connected in like manner to accumulator 112*a* with an accumulator gas side 136 and an accumulator hydraulic side 144 connected for flow to the gas-side circuit 128 and the hydraulic-side circuit 130, respectively.

Adaptive repressurizer system 100 may include a vacuum source 120 connected to gas-side circuit 128 at a vacuum port such as collect port 152 on gas-side circuit 128. The vacuum port may be disposed on the gas-side circuit 128 and may be configured to evacuate gas-side circuit 128. To recover source gas 104, source gas 104 within gas-side circuit 128 may be drawn out of adaptive repressurizer system 100. In one embodiment, source gas 104 may be drawn out of adaptive repressurizer 102 by evacuating gas-side circuit 128 by exposing the vacuum source to gas-side circuit 128 via collect port 152. In this manner, the source gas 104 is recovered.

Adaptive repressurizer 102 may include a series of valves, such as three-way valves, configured to control the flow circuit connections within adaptive repressurizer 102. The valves V1 through V6 and their inlet and outlet ports include:

- V1—A source valve 1010 has a source outlet port 1012, a utility port 1014 and a source port 1016.
- V2—The accumulator 1 valve is a first accumulator valve 1020 with a first accumulator dry port 1022, a first accumulator crossport 1024, and a first accumulator inlet port 1026.
- V3—The accumulator 2 valve is a second accumulator valve 1030 with a second accumulator dry port 1032, a second accumulator crossport 1034, and a second accumulator application port 1036.
- V4—A water valve 1040 has a water inlet port 1042, a first accumulator water port 1044 and a second accumulator water port 1046.
- V5—The pump valve 1050 has a pump port 1052, a tank port 1054 and a water outlet port 1056.
- V6—An application valve 1060 has a pressure port 1062, a collection port 1064, and application port 1066.

Adaptive repressurizer system 100 includes an enclosure 148 with a lid 150 used to protect the operator from an accumulator or pump failure. In this manner the enclosure may be termed a safety enclosure. The enclosure 148 may have the source gas container 106, piston pump 108, accumulator 112 or more than one of accumulator 112 placed inside enclosure 148. Enclosure 148 may have a support surface on which components of the adaptive repressurizer 102 may be mounted. In this manner the adaptive repressurizer 102 components may be disposed within enclosure 148. Enclosure 148 may be sealable to facilitate thermally insulating the adaptive repressurizer 102. Enclosure 148 may provide a temperature (thermal) control feature to moderate the temperature of the adaptive repressurizer 102 within a temperature range. For example, the experimental temperature may be controlled by an NMR (nuclear magnetic resonance) spectrometer. Although embodiments disclosed herein describe use of an NMR spectrometer, this is not intended to be limiting. Any suitable thermal control system providing similar functionality to that described may also be implemented without departing from the scope of the present disclosure.

Adaptive repressurizer system 100 has attachment, connection, and/or collection ports C1 (1015), C2 (1065), and C3 (1067) with these example functions: C1 1015 may facilitate vacuuming, evacuating, recovering, or pressurizing source gas 104. C1 1015 may provide connection to utility gas source 118; C2 1065 may facilitate vacuuming, evacuating, or recovering gas-side circuit 128; C3 1067 may provide the connection out of adaptive repressurizer system 100 to applications such as laboratory application 126. C3 1067 may be located at the gas output 124.

In accordance with one or more embodiments the source gas container may be connected to quantity two of accumulator 112, a first accumulator 1121 and a second accumulator 1122, by configuring and using the three-way valves: source valve 1010, first accumulator valve 1020, and second accumulator valve 1030 to control flow circuit connections. A hydraulic pump such as piston pump 108 may be filled with the hydraulic substance 116 such as distilled water. Piston pump 108 may be in hydraulic communication with hydraulic-side circuit 130 which in turn provides flow circuit connections between the piston pump 108 and the accumulator bottom 146 of the accumulator hydraulic side 144 of each of the accumulator 112. A water valve 1040 three-way valve may be included in hydraulic-side circuit 130 to select and control which one of accumulator 112 is connected to the piston pump 108 at a given time. Piston pump 108 may pressurize hydraulic substance 116 within hydraulic-side circuit 130. The gas system (gas-side circuit 128) and the water system (hydraulic-side circuit 130) remain isolated by an o-ring seal 140 on piston 132 within each one of accumulator 112. In this manner, the o-ring seal 140 separates piston dry side 134 from piston wet side 142. Source valve 1010 also allows vacuuming different compartmentalized sections of the gas-side circuit 128 with different valve states for source valve 1010, first accumulator valve 1020, and second accumulator valve 1030. Similarly, an application valve 1060 also allows vacuuming part of gas-side circuit 128.

In operation, adaptive repressurizer system 100 uses the water system (hydraulic-side circuit 130) to control the piston 132 movement in the first accumulator (1121) and the second accumulator (1122). Valves V1 to V6 with different combinations of valve settings are used to compartmentalize the gas system (gas-side circuit 128) at different steps of the method. Adaptive repressurizer 102 may include pressure sensing devices, such as a pressure transmitter and/or a digital pressure gauge, etc. The system may include a pressure safety relief capability, such as through the use of a relief valve, a rupture disk (burst disk), a bypass valve, etc., disposed to protect the system from overpressure by avoiding, preventing, and/or mitigating against over-pressure conditions. For example, if system pressure is too high in the flow line from the pump output, a burst disc in hydraulic communication with the flow line will rupture. The ruptured burst disk releases the pressure in the hydraulic side within the safety containment. The system may include the final control element. The control system may control the pressure in the system. Examples of pressure sensing devices may include pressure gauges P1 (1071) and P2 (1072). P1 1071 and P2 1072 may monitor the pressure at different compartmentalized sections. P1 1071 may monitor gas pressure in gas-side circuit 128 and P2 1072 may monitor hydraulic pressure in hydraulic-side circuit 130.

Figure 2C:
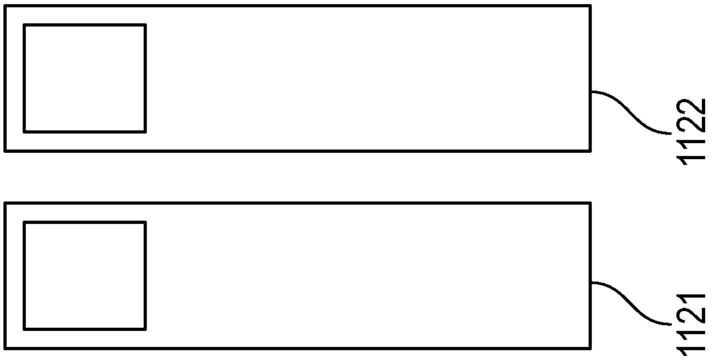
FIG. 2A, FIG. 2B, and FIG. 2C show the operational sequence in accordance with one or more embodiments.
Figure 2B:
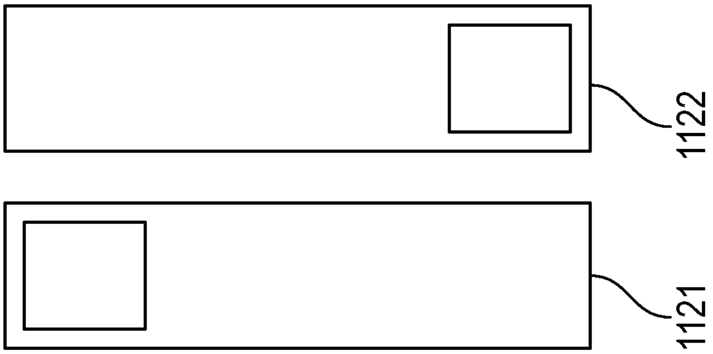
Figure 2A:
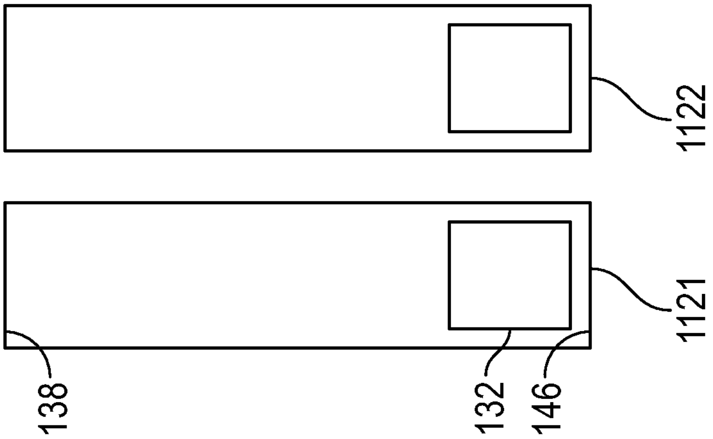

FIG. 2A, FIG. 2B, and FIG. 2C show the operational sequence to perform a repressurization cycle of the system in accordance with one or more embodiments. Step 1 is to perform an initial fill of one or both of the first accumulator 1121 and the second accumulator 1122 and the hydraulic-side circuit 130 with hydraulic substance 116 such as distilled water from tank 114. Example positions of piston 132 are illustrated in FIG. 2C.

Step 2 is to move piston 132 of one or each of accumulator 112 to the accumulator bottom 146 of each of the first accumulator 1121 and the second accumulator 1122. Utility gas 122 such as compressed air from the utility gas source 118 and connected through port C1 1015 may be used to move piston 132 in this step. Next, the water valve 1040 water valve is operated to configure the water valve 1040 to isolate the hydraulic-side circuit 130 from the accumulator hydraulic side 144 of each accumulator 112. Example positions of piston 132 are illustrated in FIG. 2A.

Step 3 is to evacuate substantially all the gases such as air out of gas-side circuit 128 by using vacuum source 120 to draw a vacuum from gas-side circuit 128. Evacuating the gas-side circuit may be performed prior to, when, or after opening the gas container to allow the source gas to flow into the gas-side circuit. Vacuum source 120 may draw the vacuum from a vacuum port such as, for example, collection port C1 1015 or C2 1065. Next is to isolate the compartmentalized section of gas-side circuit 128 to which the vacuum source 120 was connected. Example positions of piston 132 are illustrated in FIG. 2A.

Step 4 is to open the source gas container 106 to allow flow of source gas 104 into the evacuated space of gas-side circuit 128 and into the first accumulator 1121 and the second accumulator 1122. Filling the gas-side circuit may be performed prior to, when, or after evacuating the gas-side circuit. Source gas filling the volume of gas-side circuit 128 and the accumulator gas side 136 of both the first accumulator 1121 and the second accumulator 1122 may result in the pressure from within source gas container 106 equalizing with pressure within gas-side circuit 128 and accumulator gas side 136 of first accumulator 1121 and second accumulator 1122. The equalized pressure may be a first gas pressure of the source gas 104 at a first gas volume. Piston 132 positions are illustrated in FIG. 2A. If source gas 104 at the equalized volume and the equalized pressure meets the requirements for laboratory application 126, then the source gas 104 may be used for laboratory application 126 and the repressurization cycle ends. Furthermore, for example, first accumulator valve 1020 or second accumulator valve 1030 of gas-side circuit 128 may be configured to provide source gas 104 to laboratory application 126 via gas output 124. Example positions of piston 132 are illustrated in FIG. 2A. Piston 132 of either or both the first accumulator 1121 and the second accumulator 1122 may be moved to deliver gas out of gas output 124. If both pistons are moved, then the example piston 132 positions are illustrated in FIG. 2C.

Step 5 is to close off the source gas container by configuring the first accumulator valve 1020 to disallow flow between source gas container 106 and gas-side circuit 128. For example, configuring the first accumulator valve 1020 to close first accumulator inlet port 1026. Next is to configure the water valve 1040 to allow hydraulic flow between the piston pump 108 and first accumulator 1121 via hydraulic-side circuit 130 and pump valve 1050. Next is to compress the source gas 104 within the accumulator gas side 136 of first accumulator 1121 by using piston pump 108 to change, hydraulically via the piston 132, the first gas volume of the source gas 104 at the first gas pressure to a second gas volume at a second gas pressure. Example positions of piston 132 are illustrated in FIG. 2B.

Continuing with Step 5, if only one accumulator is used, such as first accumulator 1121, then source gas 104 at the second gas volume and the second gas pressure may be utilized for laboratory application 126. If, for example, the second gas volume at the second gas pressure meets the requirements for laboratory application 126, then the source gas 104 may be used for the laboratory application 126 and the repressurization cycle ends. Furthermore, for example, first accumulator valve 1020 of gas-side circuit 128 may be configured to provide source gas 104 to laboratory application 126 via gas output 124. Example positions of piston 132 are illustrated in FIG. 2B.

Continuing with Step 5, if using two accumulators, for example, then the compressing moves gas from first accumulator 1121 to second accumulator 1122. For example, as piston 132 of first accumulator 1121 moves to accumulator top 138, source gas 104 is pushed into second accumulator 1122. In this case, more specifically, piston 132 of first accumulator 1121 moves to accumulator top 138 of first accumulator 1121 and thereby provide gas out of accumulator top 138 of first accumulator 1121 through first accumulator valve 1020 via first accumulator dry port 1022 and first accumulator crossport 1024 through second accumulator valve 1030 via second accumulator crossport 1034 and second accumulator dry port 1032 into accumulator top 138 of second accumulator 1122. This step thereby drives the gas in first accumulator 1121 into second accumulator 1122 at a second volume and a second pressure. Next is to disallow flow between first accumulator 1121 and second accumulator 1122 by, for example, closing first accumulator crossport 1024 of first accumulator valve 1020 and/or closing the second accumulator crossport 1034 of second accumulator valve 1030. Example positions of piston 132 are illustrated in FIG. 2B. If source gas 104 at the second volume and the second pressure meets the requirements for laboratory application 126, then the source gas 104 may be used for laboratory application 126 and the repressurization cycle ends. Piston 132 of either or both the first accumulator 1121 and the second accumulator 1122 may be moved to deliver gas out of gas output 124. If both pistons are moved, then the example positions of piston 132 are illustrated in FIG. 2C.

Step 6 is to move piston 132 to the accumulator bottom 146 of first accumulator 1121. The pressure of the source gas 104 within the source gas container 106 may push down the piston in A1 as the pump draws water out of the bottom through the wet side circuit. In addition, the system has the capability also to use utility gas 122 such as compressed air from the utility gas source 118 connected through port C1 1015 to move piston 132 in this step. Hydraulic substance 116 within accumulator hydraulic side 144 of first accumulator 1121 may be delivered out of accumulator bottom 146 of first accumulator 1121, through hydraulic-side circuit 130 and back to tank 114. Piston 132 positions are illustrated in FIG. 2A.

Step 7 is to evacuate substantially all the gases such as air out of accumulator gas side 136 of first accumulator 1121 and gas-side circuit 128 by using vacuum source 120 to draw a vacuum from gas-side circuit 128. Vacuum source 120 may draw the vacuum from a vacuum port such as, for example, collection port C1 1015 or C2 1065. Piston 132 positions are illustrated in FIG. 2A.

Step 8 is to open the source gas container 106 to allow flow of source gas 104 into the evacuated space of gas-side circuit 128 and into accumulator gas side 136 of first accumulator 1121 and/or second accumulator 1122. Source gas filling the volume of gas-side circuit 128 and the accumulator gas side 136 of the accumulators may result in the pressure from within source gas container 106 equalizing with pressure within gas-side circuit 128 and accumulator gas side 136 of the accumulators. The equalized pressure may be a first gas pressure of the source gas 104 at a first gas volume. Piston 132 positions are illustrated in FIG. 2A.

Step 9 is to close off the source gas container by configuring the first accumulator valve 1020 to disallow flow between source gas container 106 and gas-side circuit 128. For example, configuring the first accumulator valve 1020 to close first accumulator inlet port 1026. Next is to configure the water valve 1040 to allow hydraulic flow between the piston pump 108 and first accumulator 1121 via hydraulic-side circuit 130 and pump valve 1050. Next is to configure the first accumulator valve 1020 and second accumulator valve 1030 to allow flow between first accumulator 1121 and second accumulator 1122, and compress the source gas 104 within the accumulator gas side 136 of first accumulator 1121 by using piston pump 108 to change, hydraulically via the piston 132, the first gas volume of the source gas 104 at the first gas pressure to a second gas volume at a second gas pressure. Example positions of piston 132 are illustrated in FIG. 2B.

Continuing with step 9, source gas 104 at the second gas volume and the second gas pressure may be utilized for laboratory application 126. If, for example, the second gas volume at the second gas pressure meets the requirements for laboratory application 126, then the repressurization cycle ends. Furthermore, for example, second accumulator valve 1030 of gas-side circuit 128 may be configured to provide source gas 104 to laboratory application 126 via gas output 124.

Continuing with step 9, if, for example, the second gas volume at the second gas pressure does not meet the requirements for laboratory application 126, then the repressurization cycle continues by repeating steps 6 through 9.

Repressurization cycle parameters include a set of target parameters, a set of operational parameters, and a set of data of the set of operational parameters. Target parameters include target pressure range, target volume range, and target temperature range. Operational parameters include current pressure, current volume, and current temperature. Data includes final pressure, final volume, and final temperature. An extraction is the drawing of source gas 104 out of source gas container 106 and equalizing pressure between the pressure within source gas container 106 and within gas-side circuit 128. For example, an extraction may include the steps of introducing source gas 104 through gas-side circuit 128 into accumulator gas side 136 and moving piston 132 along accumulator hydraulic side 144 to accumulator bottom 146.

Pressures and volumes at each step in the repressurization cycle may be calculated as follows. At the first extraction the resulting pressure in the source gas container and one or two accumulators can be calculated using $$\frac{p^0 V_s}{z^0} = \frac{p^1\left(V_s + V_a^1 + V_a^2\right)}{z^1} \tag{1}$$

where the volume and initial pressure of the source gas are $V_s$ and $p^0$, respectively. The volumes of the two accumulators are $$V_a^i \ (i = 1, 2).$$

Variable $p^1$ is the pressure in the source gas container and accumulators after the first extraction cycle. Variable z is the compressibility factor and a function of pressure and temperature. Note that for any gas, or $CO_2$ specifically, the ideal gas law is accurate only at low pressures. The adaptive repressurizer system 100 is also used for high pressure. Therefore, rigorous gas Equation of State (EOS) should be used, especially at high pressure. At any case, the EOS can be generally described as $$pV = z(p, T)nRT \tag{2}$$

where R=8.31 $J\cdot mol^{-1}\cdot K^{-1}$ is the specific gas constant, n is the number of moles of gas, and z(p,T) is the compressibility factor, which is a function of pressure and temperature. The $CO_2$ EOS can be found at (Roland Span and Wolfgang Wagner, A New Equation of State for Carbon Dioxide Covering the Fluid Region from the Triple-Point Temperature to 1100 K at Pressures up to 800 MPa, *J. Phys. Chem. Ref. Data,* 25, 1509-1596 (1996)). At the end of first extraction cycle, the pressure in the source gas container is then:

$$p^1 = \frac{V_s}{V_s + V_a^1 + V_a^2}\frac{z^1}{z^0}p^0 \tag{3}$$

At the second extraction, the resulting pressure $p^2$ in the source gas container and first accumulator 1121 can be calculated using:

$$\frac{p^1 V_s}{z^1} = \frac{p^2(V_s + V_a^1)}{z^2} \tag{4}$$

or $$p^2 = \frac{V_s}{V_s + V_a^1}\frac{z^2}{z^1}p^1 \tag{5}$$

The repressurization cycle may continue for k extractions. After the $k^{th}$ extraction, the pressure in the source gas container can also be calculated after k extractions as:

$$p^k = \left(\frac{V_s}{V_s + V_a^1}\right)^{k-1}\frac{V_s}{V_s + V_a^1 + V_a^2}\frac{z^k}{z^{k-1}}\cdots\frac{z^3}{z^2}\frac{z^2}{z^1}\frac{z^1}{z^0}p^0 \tag{6}$$

The pressure and amount of gas remaining in the source gas container decrease rapidly with number of extraction cycles. For a typical application with similar volumes of source gas container and accumulators, 4 to 5 extraction cycles suffice to consume source gas container 106 volume.

In accordance with one or more embodiments the majority of the gas from the source gas container may be loaded into the second accumulator 1122, where it can be compressed, using the pump, to high pressures for laboratory application 126. The gas pressure may also be reduced using the volume of one or both accumulators. The gas pressure created may be calculated using a pump controller by measuring the hydraulic pressure pushing up the piston to change the first gas pressure at a first gas volume to a second gas pressure at the second gas volume. Gas may also be measured with a gas pressure gauge connected at, for example, port C3 1067.

Figure 3:
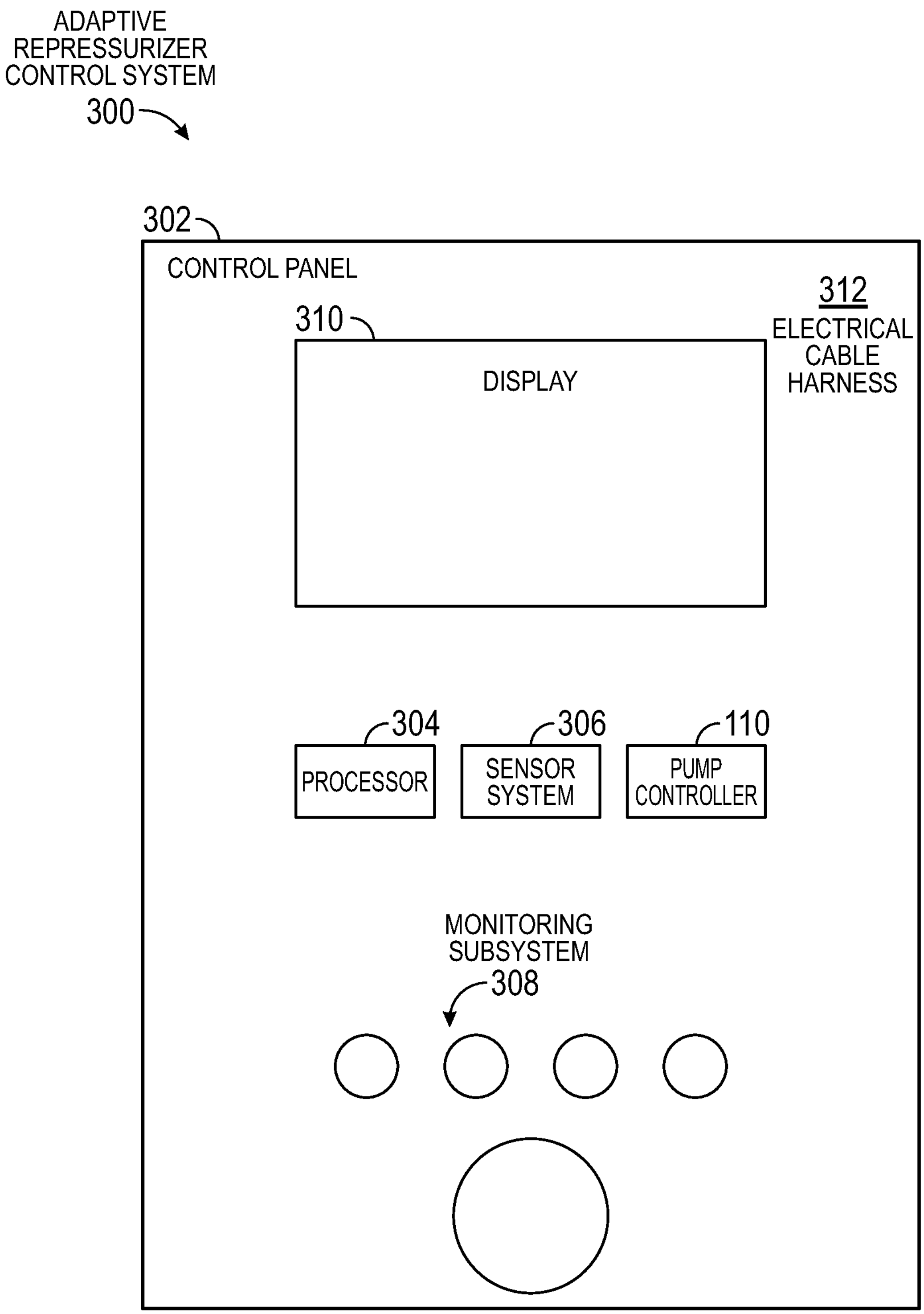
FIG. 3 shows the AR control system panel in accordance with one or more embodiments.

FIG. 3 shows in accordance with one or more embodiments a control panel 302 that uses a computer processor 304 in combination with a sensor system 306 to control the operation of adaptive repressurizer system 100. In accordance with one or more embodiments adaptive repressurizer system may include an adaptive repressurizer control system (an AR control system 300) and a monitoring subsystem 308. Sensor system 306 may include one or more sensors (e.g., pressure transmitter, temperature sensor, etc.) and/or one or more gauges (e.g., pressure gauges P1 1071 and P2 1072) configured to measure within adaptive repressurizer system 100, for example, the pressure of source gas 104 within source gas container 106, gas-side circuit 128, and/or accumulator gas side 136. Sensors and gauges of sensor system 306 may be configured to measure within adaptive repressurizer system 100, for example, the pressure of hydraulic substance 116 out of piston pump 108, within hydraulic-side circuit 130, and/or accumulator hydraulic side 144. Sensors and gauges of sensor system 306 may include a capability to measure vacuum.

The monitoring subsystem 308 may include a display 310 showing all monitored parameters, including a protection system to provide interlocks, alarms, and shutdowns as described below. The AR control system 300 may also include a computer system that is the same as or similar to that of computer system (a computer 502) described below in FIG. 5 and the accompanying description. The control panel 302 may be connected to the enclosure 148 using a suitable means such as screws, bolts, welds, etc. and using suitable materials such as plastic, angle iron, cold-rolled steel, hot-rolled steel, aluminum, etc.

In one or more embodiments, an electrical cable harness 312 may be used to connect all of the electrical components of the adaptive repressurizer system 100. The electrical cable harness 312 is also configured to transmit current and keep control over the system.

Figure 4A:
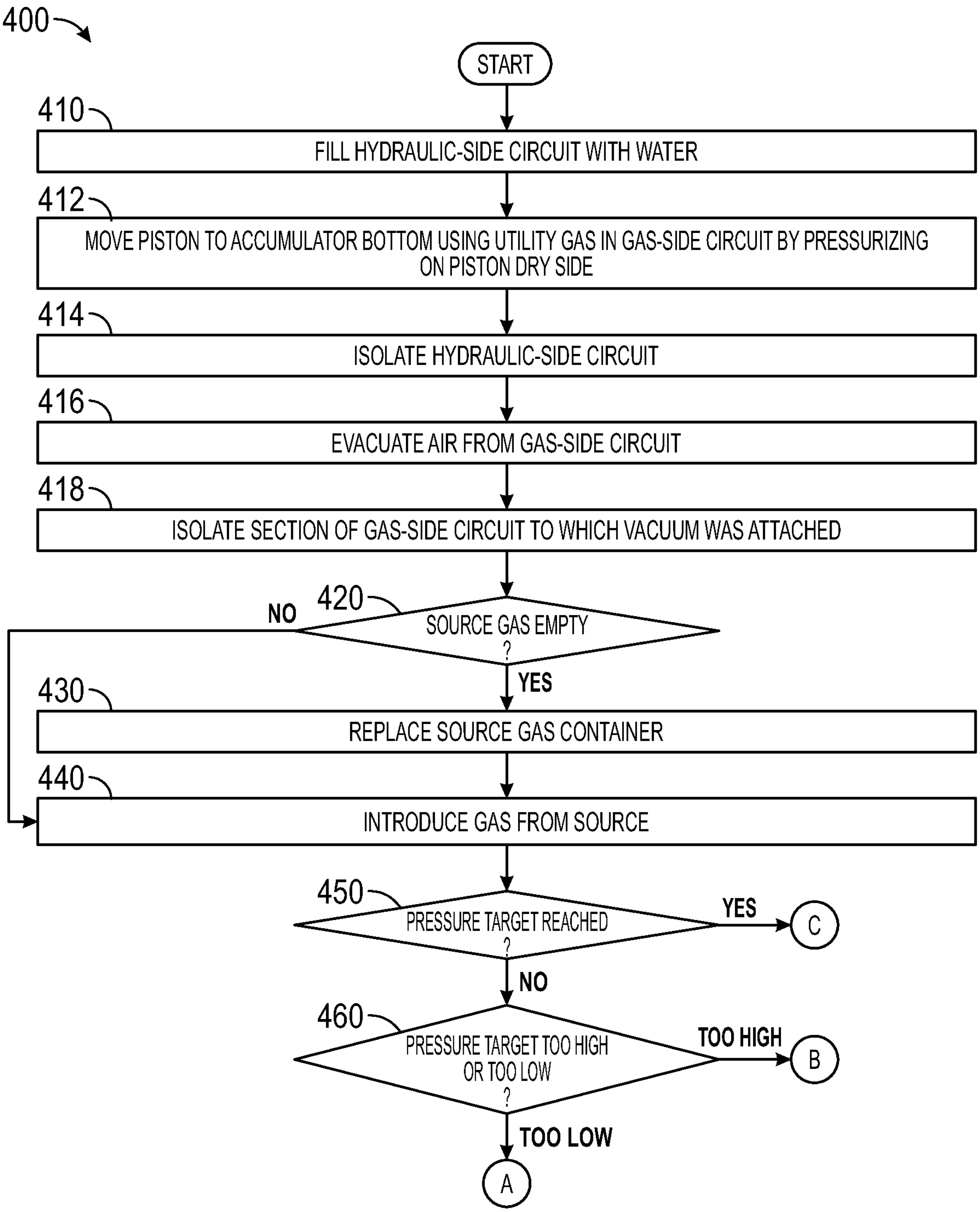
FIGS. 4A, 4B, and 4C show flowcharts of a method in accordance with one or more embodiments.
Figure 4B:
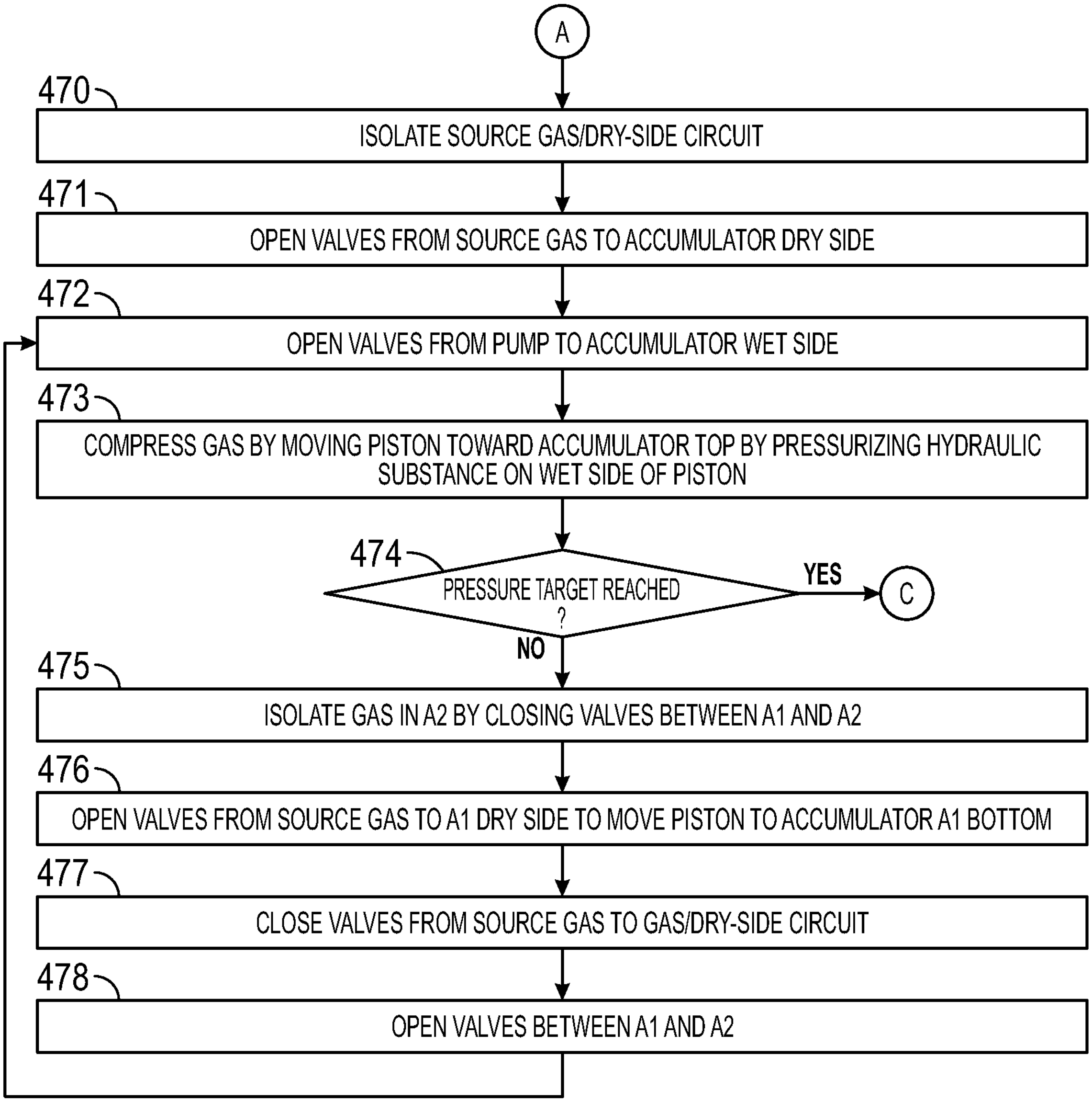
Figure 4C:
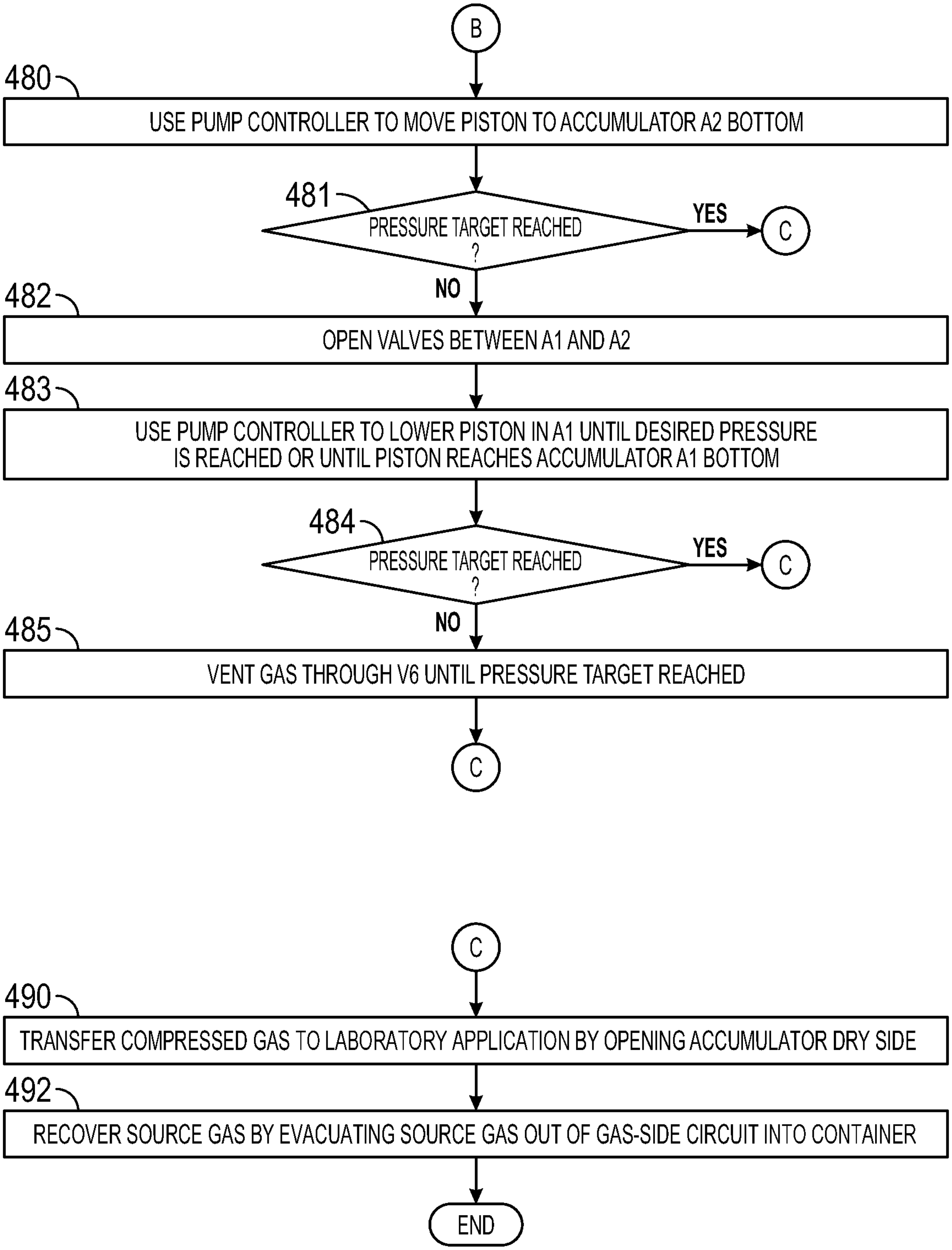

FIGS. 4A, 4B, and 4C show flowcharts of a method 400 in accordance with one or more embodiments. By following the method 400 a source gas 104 may be used for a laboratory application 126 and subsequently recovered. Source gas 104 at a first gas pressure may be changed to a second gas pressure for being applied to the laboratory application 126. The method may be implemented to change the first gas pressure to a second gas pressure that is a lower second gas pressure than a first gas pressure, such as the source gas container 106 pressure, or at a second gas pressure that is a higher second gas pressure than the first gas pressure, such as the source gas container 106 pressure. Further, one or more steps in FIGS. 4A, 4B, and 4C may be performed by one or more components as described in FIGS. 1-3 (e.g., the adaptive repressurizer system 100). While the various steps in FIGS. 4A, 4B, and 4C are presented and described sequentially, one of ordinary skill in the art will appreciate that some or all of the steps may be executed in different orders, may be combined or omitted, and some or all of the steps may be executed in parallel. Furthermore, the steps may be performed actively or passively.

The method 400 may further include using the AR control system 300 with the monitoring subsystem 308 to automate the recovering of the source gas 104 subsequent to application of source gas 104 at a specific pressure using the adaptive repressurizer system 100. The AR control system 300 uses control panel 302 with the computer processor 304 and the computer processor 304 to perform the automation of the recovering of the source gas 104. Method 400 may include signaling the adaptive repressurizer system 100 to recover source gas 104 such as by receipt of at least one actuation signal from the monitoring subsystem 308. The AR control system 300 may send the signal.

Method 400 may also include using the computer processor 304 to start timers such as a pump timer that shuts down piston pump 108 if a target pressure range is not met after a duration of time such as a pump run max timer. Method 400 may use the computer processor 304 to shut down piston pump 108 if a maximum pressure limit, such as a hydraulic substance pressure range, is met or exceeded. Method 400 may use computer processor 304 to calculate a gas pressure within the accumulator gas side 136 by using data, such as hydraulic substance pressure within accumulator hydraulic side 144 and diameter and friction drag of piston 132 within accumulator 112. The computer processor 304 may integrate readiness states from the monitoring subsystem 308. Readiness states may include alarms such as high or low temperature limit exceedance, the lid 150 of enclosure 148 in an open state, the level (volume) of the hydraulic substance 116 within tank 114 below a minimum limit, or the pressure, mass, level (volume), or temperature of source gas 104 within source gas container 106 exceeding high and/or low limits, system shutdown alarm, etc.

The sensors of the sensor system 306 may be configured to provide operational data corresponding to operational parameters of the adaptive repressurizer system 100. For example, the sensors may be configured to provide actual pressure data (e.g., source gas 104 pressure.) sensor system 306 may include sensors such as those for detecting that the piston pump 108 is running and for measuring pressure and temperature and other operational parameters.

The sensor system 306 may be operatively coupled to the control panel 302 for conveying data to the control panel 302 corresponding to characteristics of components of the adaptive repressurizer system 100 as well as operational data of the piston pump 108 and the accumulator 112. For example, the data may include volume, mass, temperature, and pressure. To that end, such sensors may include level (volume) sensors, weight (mass) sensors, temperature sensors, pressure sensors, etc. Sensors may include magnetic, induction, or acoustic sensors for detecting the relative position of piston 132 within each accumulator 112. Sensors may detect and/or record gas leaks such as by detecting and/or recording the level of source gas 104 in the enclosure air through electrochemical reaction, electrical currents, ultrasonic detection, etc. The sensor data may be recorded on computer-readable storage media by the control panel 302 and/or transmitted by the control panel 302 to one or more monitoring entities.

The monitoring subsystem 308 may monitor the piston pump 108 power input to prevent starting the piston pump 108 if lid 150 is open. Monitoring subsystem 308 may monitor the gas-side circuit 128 pressure or the hydraulic-side circuit 130 pressure to obtain a pressure value and may compare the obtained pressure value, using the computer processor, with a pressure range. The monitoring subsystem 308 may control the piston pump 108 using the compared pressure. The monitoring subsystem 308 may monitor the pump run duration timer to shut down piston pump 108 if the pump run duration has expired. In this manner, the AR control system 300 controls, using the computer processor 304, the adaptive repressurizer system 100 in response to the comparing.

The monitoring subsystem 308 may monitor the temperature within enclosure 148 to obtain a temperature value and may compare the obtained temperature value, using the computer processor, with an enclosure temperature range. The monitoring subsystem 308 may report an enclosure temperature alarm using the compared enclosure temperature. The monitoring subsystem 308 may control an enclosure isothermal control device for temperature stability.

According to further embodiments, the adaptive repressurizer system 100 may include an interlock to prevent starting the piston pump 108 if piston 132 is not in a position such as the accumulator bottom 146, if the lid 150 is not closed, if the hydraulic substance 116 level in the tank 114 is too low, etc. The adaptive repressurizer system 100 may also include an interlock to prevent starting adaptive repressurizer 102 if the source gas container 106 pressure does not meet a source gas pressure range requirement, such as a range of 290 to 315 psi. Further, adaptive repressurizer system 100 may include an interlock to prevent starting adaptive repressurizer 102 if the hydraulic-side circuit 130 has not been bled to meet a compressibility range. The adaptive repressurizer system 100 may also include an alarm that will sound if the enclosure temperature does not fall within an enclosure temperature range such as from room temperature to 140° F. (degrees Fahrenheit.) A system shutdown may also be included to shut down the system, if the lid 150 is opened while adaptive repressurizer 102 is running.

Method 400 may further involve storing an operational record, e.g., maintained in the computer-readable storage media, in a database, or other suitable data storage structure operatively connected to the control panel and part of the computer system. An illustrative operational record may comprise any data suitable for tracking the operational characteristics of the source gas 104 during the repressurization and recovery. For example, the operational record may include the pump specifications such as pump pressure rating, accumulator specifications such as piston diameter and piston o-ring friction drag, source gas nominal composition, the source gas measured purity, the specific gas constant of the source gas, number of moles of source gas, etc. The operational record may include the compressibility factor as a function of pressure and temperature of the source gas, etc. with a record of the time and date at which the record was made (a time stamp.)

In addition to storing the operational record, the operational record may be reported, for example, to a monitoring entity. According to some embodiments, the report may include a parameter, such as mass, moles, volume, and/or temperature, indicating the amount of the source gas recovered from the adaptive repressurizer 102. The report may indicate the amount of recovered source gas and may determine if the desired outcome was achieved and, if not, the report may indicate that the desired outcome was not achieved and that further examination of the system may be desirable. In a case of desired outcome not achieved, the report may include an alert and an advisory to the monitoring entity and/or one or more concerned entities (e.g., a technician), as desired.

Preparation step 410. Referring to FIGS. 1-3 together, prepare adaptive repressurizer 102 for use by disposing at least one of accumulator 112 within the adaptive repressurizer system 100. Connect the accumulator gas side 136 to gas-side circuit 128 and accumulator hydraulic side 144 to hydraulic-side circuit 130. Connect the hydro source such as tank 114 containing hydraulic substance 116 such as distilled water to the hydraulic-side circuit 130 to allow a hydraulic-flow connection with the hydraulic-side circuit 130. Then fill hydraulic-side circuit 130 with hydraulic substance 116, thereby, in at least one of accumulator 112, ensuring the piston 132 is at accumulator top 138, and/or moving the piston 132 up to accumulator top 138.

Bleed step 412. The repressurization cycle is begun by connecting utility gas source 118 containing utility gas 122, such as compressed air, to the gas-side circuit 128 to allow a gas-flow connection with the gas-side circuit 128. Then, the piston is moved to accumulator bottom 146 using utility gas 122 in gas-side circuit 128 by relieving pressure on piston wet side 142 thereby returning hydraulic substance 116 in accumulator hydraulic side 144 back to tank 114 and, thus, ensuring hydraulic-side circuit 130 is bled of air, i.e., is filled with water rather than air.

Lock step 414. The hydraulic-side circuit 130 is isolated by operating the water valve 1040 to configure the water valve 1040 to disallow hydraulic flow into or out of accumulator hydraulic side 144, thereby hydraulically locking piston 132 at the accumulator bottom 146 so the piston 132 does not move.

Vacuum step 416. This step may evacuate the gas-side circuit 128. A vacuum is drawn from gas-side circuit 128 by connecting vacuum source 120, thereby evacuating air from gas-side circuit 128 and accumulator gas side 136. In accordance with one or more embodiments, the piston 132 may remain substantially stationary at accumulator bottom 146 of accumulator hydraulic side 144. A vacuum source 120 may be connected, for example, at a vacuum port such as at the C1 1015.

Isolate accumulator step 418. The source valve 1010 is configured to disallow flow to/from the utility port 1014 into/out of the compartmentalized section of gas-side circuit 128 to which the vacuum source 120 may have been connected, thereby isolating accumulator gas side 136.

Source ready step 420. The source is checked, and extraction is prepared for by disposing source gas container 106 containing source gas 104 within the adaptive repressurizer system 100 and connecting the source gas container 106 to the gas-side circuit 128 within the adaptive repressurizer system 100 to allow a gas-flow connection with the gas-side circuit 128. Then, the process continues to prepare for extraction by checking the pressure and/or the volume of source gas within source gas container 106 to determine readiness states of the source gas container 106 such as source ready or source not ready. The readiness state source not ready may be, for example, if the volume and/or pressure within source gas container 106 is below a readiness state pressure and/or volume limit, such as if the source gas container 106 is empty or below a minimum volume to start repressurization.

The computer processor 304 of the control panel 302 may monitor a set of operational parameters of the adaptive repressurizer system 100 using sensor system 306. Computer processor 304 may collect a set of data of the set of operational parameters. The monitoring subsystem 308 may comprise, for example, pressure, temperature, and volume (or quantity) monitoring of the hydraulic substance 116 in the tank 114, the source gas 104 in the source gas container 106, the temperature within enclosure 148, and other parameters. If the source gas container 106 readiness state is source ready, such as source gas tank full or source gas tank is above a minimum volume to start repressurization, (420: no) then continue to first extraction step 440. If the source gas container 106 readiness state is source not ready, such as source gas empty, (420: yes) then continue to the swap cylinder step 430.

Swap cylinder step 430. If the source gas container 106 readiness state is source not ready (source gas empty) (420: yes), then the source gas container 106 is replaced, e.g., such as by a monitoring entity or technician. In one or more embodiments, the source gas container 106 is replaced and/or the adaptive repressurizer system 100 is otherwise remedied to achieve a source ready state. Then, the process continues to the first extraction step 440.

First extraction step 440. During this step, the gas-side circuit 128 may be filled with source gas 104. Then, extraction may be begun by configuring the source valve 1010 and the first accumulator valve 1020 to allow flow of source gas 104 from source gas container 106 into gas-side circuit 128 and accumulator gas side 136, thereby introducing source gas 104 from source gas container 106 into gas-side circuit 128 and accumulator gas side 136 in which there may have been a vacuum. Volume and pressure of source gas 104 within the source gas container 106 is $V_s$ and $p^0$ respectively. Source gas 104 pressure may equalize at a pressure $p^1$ across the source gas container 106, gas-side circuit 128, and accumulator gas side 136. The source gas 104 equalized pressure $p^1$ may be a lower pressure than the pressure within source gas container 106.

First target pressure step 450. The target pressure is checked, and equalized pressure $p^1$ is compared with the requirements of laboratory application 126. If equalized pressure $p^1$ meets the requirements (450: yes), then the source gas 104 at the lower second pressure may be used for the laboratory application 126 and the process continues to transfer step 490. If equalized pressure $p^1$ does not meet the requirements of laboratory application 126 (450: no), then the process goes to the pressure comparison step 460.

Pressure comparison step 460. If equalized pressure $p^1$ is lower than the requirements of laboratory application 126 (460: too low), then the process moves to the first gas step 470. If equalized pressure $p^1$ is higher than (exceeds) the requirements of laboratory application 126 (460: too high), then the process moves to the pressure reduction step 480.

First gas step 470. The source valve 1010 and the first accumulator valve 1020 are configured to disallow flow of source gas 104 from source gas container 106 into gas-side circuit 128 and accumulator gas side 136, thereby isolating source gas 104 within accumulator gas side 136.

First crossover step 471. The first accumulator valve 1020 and second accumulator valve 1030 are configured to allow flow of source gas 104 from accumulator gas side 136 of first accumulator 1121 into accumulator gas side 136 of second accumulator 1122.

Open hydro step 472. The water valve 1040 and pump valve 1050 are configured to allow flow of hydraulic substance 116 from tank 114 through the piston pump 108 and to accumulator hydraulic side 144 of first accumulator 1121, and to disallow flow to accumulator hydraulic side 144 of second accumulator 1122.

Pressurization step 473. The piston pump 108 is engaged to apply hydraulic pressure to hydraulic-side circuit (piston wet side 142) to move piston from accumulator bottom 146 toward accumulator top 138 of first accumulator 1121, thereby compressing source gas 104 in the accumulator gas side 136 of first accumulator 1121 and delivering source gas 104 into accumulator gas side 136 of second accumulator 1122.

Second target pressure step 474. The target pressure is checked, and the resulting second pressure in second accumulator 1122 is compared with the requirements of laboratory application 126. If the second pressure meets the requirements (474: yes), then the source gas 104 in second accumulator 1122 may be used for the laboratory application 126. Then, the process continues to transfer step 490. If the second pressure in second accumulator 1122 does not meet the requirements of laboratory application 126 (474: no), then the process continues with isolation step 475.

Isolation step 475. Gas is isolated in A2. The second pressure is isolated in second accumulator by closing the valves between A1 and A2. The first accumulator valve 1020 and the second accumulator valve 1030 are configured to disallow flow of gas out of A2, thereby isolating source gas 104 within accumulator gas side 136 of A2.

Second extraction step 476. The valves from source gas to A1 are opened. The source valve 1010 and the first accumulator valve 1020 are configured to allow flow of source gas 104 from source gas container 106 into gas-side circuit 128 and accumulator gas side 136, thereby introducing source gas 104 from source gas container 106 into gas-side circuit 128 and accumulator gas side 136. In this manner, the piston 132 of first accumulator 1121 may move toward accumulator bottom 146.

Second gas step 477. The source gas is isolated from the gas-side circuit 128. The source valve 1010 and the first accumulator valve 1020 are configured to disallow flow of source gas 104 from source gas container 106 into gas-side circuit 128 and accumulator gas side 136, thereby isolating source gas 104 within accumulator gas side 136.

Second crossover step 478. The valves between A1 and A2 are opened. The first accumulator valve 1020 and second accumulator valve 1030 are configured to allow flow of source gas 104 from accumulator gas side 136 of first accumulator 1121 into accumulator gas side 136 of second accumulator 1122. Then, the process continues with open hydro step 472.

Pressure reduction step 480. Using the pump controller, the piston in A2 is moved toward accumulator bottom. The water valve 1040 and pump valve 1050 are configured to allow flow of hydraulic substance 116 from tank 114 through the piston pump 108 and to accumulator hydraulic side 144 of second accumulator 1122, and to disallow flow to accumulator hydraulic side 144 of first accumulator 1121. The controller is configured to draw water out of second accumulator 1122 to move piston 132 to accumulator bottom 146.

Third target pressure step 481. The target pressure is checked, and the resulting second pressure in second accumulator 1122 is compared with the requirements of laboratory application 126. If the second pressure meets the requirements (481: yes), then the source gas 104 in second accumulator 1122 may be used for the laboratory application 126. Then, the process continues to transfer step 490. If the second pressure in second accumulator 1122 does not meet the requirements of laboratory application 126 (481: no), then the process continues with accumulator communication step 482.

Accumulator communication step 482. The first accumulator valve 1020 and second accumulator valve 1030 are configured to allow flow of source gas 104 from accumulator gas side 136 of second accumulator 1122 into accumulator gas side 136 of first accumulator 1121.

Lower pressure step 483. Using the pump controller, the piston in A1 is moved toward accumulator bottom. The water valve 1040 and pump valve 1050 are configured to allow flow of hydraulic substance 116 from tank 114 through the piston pump 108 and to accumulator hydraulic side 144 of first accumulator 1121, and to disallow flow to accumulator hydraulic side 144 of second accumulator 1122. The controller is configured to draw water out of first accumulator 1121 to move piston 132 toward accumulator bottom 146. The pump controller is configured to stop drawing water out when the target pressure is reached or when the piston 132 reaches the accumulator bottom 146.

Fourth target pressure step 484. The target pressure is checked, and the resulting second pressure in second accumulator 1122 is compared with the requirements of laboratory application 126. If the second pressure meets the requirements (484: yes), then the source gas 104 in second accumulator 1122 may be used for the laboratory application 126. Then, the process continues to transfer step 490. If the second pressure in second accumulator 1122 does not meet the requirements of laboratory application 126 (484: no), then the process continues with gas vent step 485.

Gas vent step 485. The application valve 1060 is configured to allow flow of source gas 104 to the vacuum source 120. The gas-side circuit 128 is vented, recovered, and/or evacuated by drawing source gas 104 out of gas-side circuit 128 using the vacuum source 120 until the target pressure is reached. Then, the process continues with transfer step 490.

Transfer step 490 (from 450: yes, 474: yes, 481: yes, 484: yes, or from gas vent step 485). The source gas is applied at second pressure out to the laboratory application 126 by opening accumulator dry side. Then, the process moves to the recovery step 492.

Recovery step 492. The vacuum source 120 is connected to adaptive repressurizer system 100 at a connection port such as C1 1015. The source valve 1010, first accumulator valve 1020, second accumulator valve 1030 and application valve 1060 are configured to allow flow of source gas 104 to the vacuum source 120. The gas-side circuit 128 is evacuated by drawing source gas 104 out of gas-side circuit 128 using the vacuum source 120 and delivering source gas 104 into an appropriate container or vessel such as source gas container 106.

While the use of one or two accumulators have been used as illustrative embodiments described in detail above, those skilled in the art will readily appreciate that many modifications are possible in the example embodiments without materially departing from the scope of the present disclosure. For example, if three or more (quantity $i_{accum}$) accumulators are used, then repeat method from the preparation step 410 through the recovery step 492 for the third accumulator and/or the third through the $i_{accum}^{th}$ accumulators.

Figure 5:
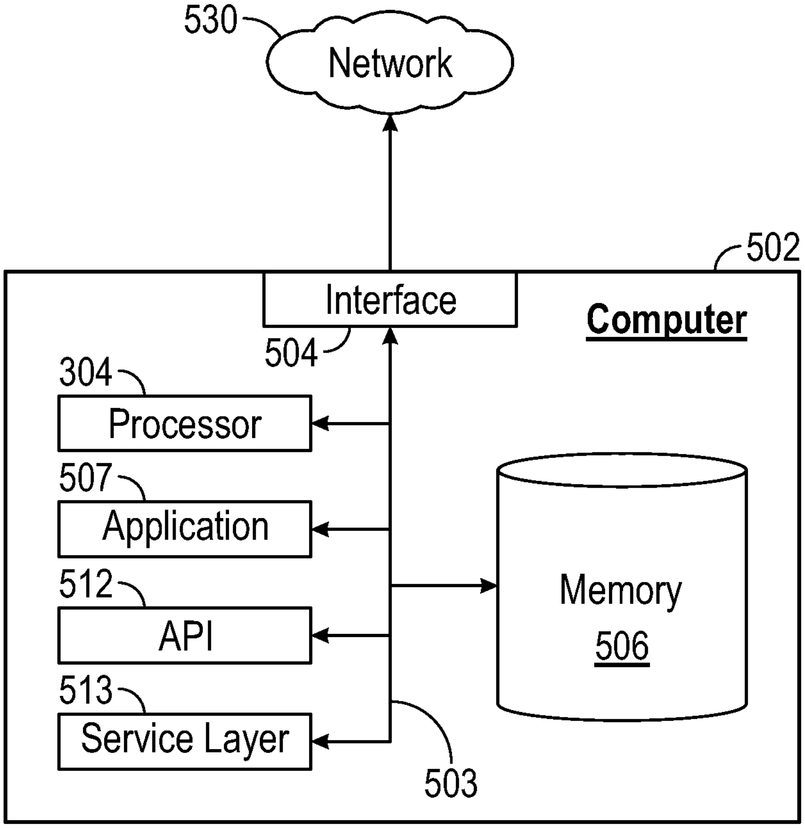
FIG. 5 shows a computer system in accordance with one or more embodiments.

Embodiments disclosed herein may be implemented on a computer system. FIG. 5 is a block diagram of a computer system (or computing device) (a computer 502) used to provide computational functionalities associated with described algorithms, methods, functions, processes, flows, and procedures as described in the instant disclosure, according to an implementation. The computer 502 illustrated in FIG. 5 is intended to encompass any computing device such as a server, desktop computer, laptop/notebook computer, wireless data port, smart phone, personal data assistant (PDA), tablet computing device, one or more processors within these devices, or any other suitable processing device, including both physical or virtual instances (or both) of the computing device. Additionally, the computer 502 may include an input device, such as a keypad, keyboard, touchscreen, or other device that can accept user information, and an output device that conveys information associated with the operation of the computer 502, including digital data, visual, or audio information (or a combination of information), or a GUI. The output device may include a screen (e.g., a liquid crystal display (LCD), a plasma display, a light emitting diode (LED) display, an organic light-emitting diode (OLED) display, touchscreen, cathode ray tube (CRT) monitor, projector, or other display device), a printer, external storage, or any other output device. One or more of the output devices may be the same or different from the input device(s). Many different types of computing systems exist, and the aforementioned input and output device(s) may take other forms.

The computer 502 can serve in a role as a client, network component, a server, a database, or other persistency, or any other component (or a combination of roles) of a computer system for performing the subject matter described in the instant disclosure. Computer 502 is communicably coupled with a network 530. In some implementations, one or more components of the computer 502 may be configured to operate within environments, including cloud, fog, or edge-computing-based, local, global, or other environment (or a combination of environments.)

At a high level, the computer 502 is an electronic computing device operable to receive, transmit, process, store, or manage data and information associated with the described subject matter. According to some implementations, the computer 502 may also include or be communicably coupled with an application server, e-mail server, web server, caching server, streaming data server, business intelligence (BI) server, or other server (or a combination of servers.)

The computer 502 can receive requests over network 530 from a client application (for example, executing on another one of computer 502) and responding to the received requests by processing the said requests in an appropriate software application. In addition, requests may also be sent to computer 502 from internal users (for example, from a command console or by other appropriate access method), external or third-parties, other automated applications, as well as any other appropriate entities, individuals, systems, or computers.

Each of the components of the computer 502 can communicate using a system bus 503. In some implementations, any or all of the components of the computer 502, both hardware or software (or a combination of hardware and software), may interface with each other or an interface 504 (or a combination of both) over the system bus 503 using an application programming interface (an API 512) or a service layer 513 (or a combination of the API 512 and the service layer 513. The API 512 may include specifications for routines, data structures, and object classes. The API 512 may be either computer-language independent or dependent and refer to a complete interface, a single function, or even a set of APIs. The service layer 513 provides software services to the computer 502 or other components (whether illustrated, or) that are communicably coupled to the computer 502. The functionality of the computer 502 may be accessible for all service consumers using this service layer. Software services, such as those provided by the service layer 513, provide reusable, defined business functionalities through a defined interface. For example, the interface may be software written in JAVA, C++, or other suitable language providing data in extensible markup language (XML) format or other suitable format. While illustrated as an integrated component of the computer 502, alternative implementations may illustrate the API 512 or the service layer 513 as stand-alone components in relation to other components of the computer 502 or other components (whether or not illustrated) that are communicably coupled to the computer 502. Moreover, any or all parts of the API 512 or the service layer 513 may be implemented as child or sub-modules of another software module, enterprise application, or hardware module without departing from the scope of this disclosure.

The computer 502 includes an interface 504. Although illustrated as a single one of interface 504 in FIG. 5, two or more of the interface 504 may be used according to particular needs, desires, or particular implementations of the computer 502. The interface 504 is used by the computer 502 for communicating with other systems in a distributed environment that are connected to the network 530. Generally, the interface 504 includes logic encoded in software or hardware (or a combination of software and hardware) and operable to communicate with the network 530. More specifically, the interface 504 may include software supporting one or more communication protocols associated with communications such that the network 530 or interface's hardware is operable to communicate physical signals within and outside of computer 502.

Computer 502 includes at least one of the computer processor 304. Although illustrated as a single one of computer processor 304 in FIG. 5, two or more processors may be used according to particular needs, desires, or particular implementations of the computer 502. Generally, the computer processor 304 executes instructions and manipulates data to perform the operations of the computer 502 and any algorithms, methods, functions, processes, flows, and procedures as described in the instant disclosure.

The computer 502 also includes a memory 506 that holds data for computer 502 or other components (or a combination of both) that can be connected to network 530. For example, memory 506 may be a database storing data consistent with this disclosure. Although illustrated as a single one of memory 506 in FIG. 5, two or more memories may be used according to particular needs, desires, or particular implementations of the computer 502 and the described functionality. While the memory 506 is illustrated as an integral component of the computer 502, in alternative implementations, the memory 506 may be external to the computer 502. Memory 506 may include non-persistent and persistent storage. The input and output device(s) may be locally or remotely connected to the computer processor 304 and the memory 506.

The application 507 is an algorithmic software engine providing functionality according to particular needs, desires, or particular implementations of the computer 502, particularly with respect to functionality described in this disclosure. For example, application 507 can serve as one or more components, modules, applications, etc. Further, although illustrated as a single one of application 507, the application 507 may be implemented as more than one of application 507 on the computer 502. In addition, although illustrated as integral to the computer 502, in alternative implementations, the application 507 can be external to the computer 502.

There may be any number of the computer 502 associated with, or external to, a computer system containing the computer 502, wherein each computer 502 communicates over network 530. Further, the terms "client," "user," and other appropriate terminology may be used interchangeably as appropriate without departing from the scope of this disclosure. Moreover, this disclosure contemplates that many users may use one of computer 502, or that one user may use multiple ones of computer 502.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed is:

1. A method for recovering a source gas at a specific pressure using an adaptive repressurizer system comprising a series of valves configured to control flow circuit connections within the adaptive repressurizer system, the method comprising:

disposing a gas container containing the source gas within the adaptive repressurizer system;

connecting the gas container to a gas-side circuit within the adaptive repressurizer system so as to allow a gas-flow connection with the gas-side circuit;

connecting a hydro source comprising a hydraulic substance to a hydraulic-side circuit within the adaptive repressurizer system so as to allow a hydraulic-flow connection with the hydraulic-side circuit;

connecting a utility gas source comprising a utility gas to the gas-side circuit so as to allow a gas-flow connection with the gas-side circuit;

connecting a vacuum source to the gas-side circuit at a vacuum port disposed on the gas-side circuit and configured to evacuate the gas-side circuit and to draw the source gas out to recover the source gas;

disposing an accumulator within the adaptive repressurizer system, wherein the accumulator comprises a piston, which is configured with a dry side of the piston for interaction with the gas-side circuit and a wet side of the piston for interaction with the hydraulic-side circuit within the adaptive repressurizer system, and wherein an accumulator gas side is connected to the gas-side circuit so as to allow a gas-flow connection with the gas-side circuit and an accumulator hydraulic side is connected to the hydraulic-side circuit;

moving the piston by pressurizing the gas-side circuit with the utility gas from the utility gas source applied to the dry side of the piston;

actuating the adaptive repressurizer system to change a first gas pressure of the source gas to a second gas pressure;

applying the source gas at the second gas pressure to a laboratory application; and recovering the source gas by drawing the source gas out of the adaptive repressurizer system by evacuating the gas-side circuit through the vacuum port to the vacuum source.

2. The method of claim 1, wherein the adaptive repressurizer system further comprises an adaptive repressurizer control system (AR control system) comprising a computer processor configured to automate, upon receipt of an actuation signal sent from the AR control system to the adaptive repressurizer system, the changing of the gas pressure of the source gas.

3. The method of claim 2, wherein the adaptive repressurizer system further comprises a set of target parameters within the AR control system;

wherein the changing the gas pressure of the source gas further comprises:

monitoring, using the computer processor, a set of operational parameters of the adaptive repressurizer system;

collecting, using the computer processor, a set of data of the set of operational parameters;

comparing, using the computer processor, the set of data with the set of target parameters;

reporting, using the computer processor, a result of the comparing; and controlling, using the computer processor, the adaptive repressurizer system in response to the comparing.

4. The method of claim 3, wherein the adaptive repressurizer system further comprises:

a monitoring subsystem;

wherein the monitoring subsystem comprises monitoring a source gas pressure and a hydraulic substance pressure.

5. The method of claim 4, wherein:

the actuating the adaptive repressurizer system further comprises integrating, using the computer processor, readiness states from the monitoring subsystem.

6. The method of claim 4, wherein the monitoring comprises:

comparing the source gas pressure, using the computer processor, against a source gas pressure range; and comparing the hydraulic substance pressure, using the computer processor, against a hydraulic substance pressure range.

7. The method of claim 1, wherein the changing the gas pressure of the source gas comprises:

configuring the accumulator to move the piston hydraulically when or after the hydraulic-side circuit is pressurized to change the gas pressure of the source gas by changing a first gas volume at a first gas pressure to a second gas volume at a second gas pressure.

8. The method of claim 7, wherein:

the accumulator comprises a first accumulator and a second accumulator; and the changing the gas pressure of the source gas comprises pressurizing the second accumulator with the second gas volume at the second gas pressure.

9. The method of claim 1, wherein:

the adaptive repressurizer system further comprises an enclosure comprising a support surface wherein the gas-side circuit, the hydraulic-side circuit, and the accumulator are mounted to the support surface;

wherein the disposing the gas container within the adaptive repressurizer system further comprises disposing the gas container within the enclosure; and wherein the enclosure comprises a sealable enclosure thermally insulating the adaptive repressurizer system;

wherein the changing the gas pressure of the source gas further comprises maintaining a temperature of the adaptive repressurizer system within a temperature range.

10. The method of claim 1, wherein changing the gas pressure of the source gas further comprises:

disposing a hydraulic pump within the adaptive repressurizer system;

arranging the hydraulic pump within the hydraulic-side circuit to pressurize the hydraulic-side circuit; and engaging the hydraulic pump.

11. The method of claim 1, wherein changing the gas pressure of the source gas further comprises:

evacuating the gas-side circuit prior to, when, or after opening the gas container to allow the source gas to flow into the gas-side circuit.

12. The method of claim 11, wherein actuating the adaptive repressurizer system further comprises:

filling the gas-side circuit prior to, when, or after evacuating the gas-side circuit.

13. An adaptive repressurizer system for changing a gas pressure of a source gas, the adaptive repressurizer system comprising:

a series of valves configured to control flow circuit connections within the adaptive repressurizer system;

a gas container containing the source gas;

a gas-side circuit configured to contain the source gas at a first gas pressure and connected to the gas container through a gas-flow connection;

a hydraulic-side circuit connected through a hydraulic-flow connection to a hydro source comprising a hydraulic substance and configured to hold the hydraulic substance disposed in the hydraulic-side circuit at a hydraulic substance pressure, wherein the hydraulic substance disposed in the hydraulic-side circuit and configured to be pressurized by a hydraulic pump to increase, hydraulically via a piston, the first gas pressure of the source gas to a second gas pressure by moving the piston from a first position to a second position thereby changing a first gas volume at the first gas pressure to a second gas volume at the second gas pressure when or after the hydraulic-side circuit is pressurized, and wherein the hydraulic pump disposed within the adaptive repressurizer system and configured to pressurize the hydraulic-side circuit;

an enclosure for the adaptive repressurizer system comprising a support surface wherein the gas-side circuit, the hydraulic-side circuit, and an accumulator are mounted to the support surface, wherein the gas container is disposed within the enclosure;

a utility gas from a utility gas source arranged in communication with a dry side of the piston and configured to move the piston from the second position to the first position when the utility gas is applied to the dry side of the piston;

the accumulator comprising:

an accumulator gas side connected to the gas-side circuit, an accumulator hydraulic side hydraulically connected to the hydraulic-side circuit, and the piston configured with the dry side of the piston and a wet side of the piston, wherein the accumulator is configured to change, hydraulically via the piston, the first gas pressure of the source gas to the second gas pressure by changing the first gas volume at the first gas pressure to the second gas volume at the second gas pressure; and an adaptive repressurizer control system (AR control system) comprising a computer processor configured to automate, upon receipt of an actuation signal sent from the AR control system to the adaptive repressurizer system, thus changing the gas pressure of the source gas, wherein the source gas at the second gas pressure is applied to a laboratory application, and wherein the source gas is drawn out of the adaptive repressurizer system.

14. The adaptive repressurizer system of claim 13, wherein:

the accumulator comprises a first accumulator and a second accumulator.

15. The adaptive repressurizer system of claim 13, further comprising:

a vacuum source connected to the gas-side circuit at a vacuum port disposed on the gas-side circuit and configured to evacuate the gas-side circuit and to draw the source gas out to recover the source gas.

16. The adaptive repressurizer system of claim 13, further comprising:

a monitoring subsystem configured to monitor the gas pressure of the source gas and the hydraulic substance pressure of the hydraulic substance.

17. The adaptive repressurizer system of claim 13, wherein:

the hydraulic substance comprises a composition consisting essentially of distilled water; and the utility gas comprises a composition consisting essentially of compressed air.

* * * * *